Patented Sept. 7, 1937

2,092,398

UNITED STATES PATENT OFFICE 2,092,398

AZO DYESTUFFS AND PROCESS OF PRODUCING SAME

Hans Krzikalla and Paul Garbsch, Ludwigshafen-on-the-Rhine, Germany, assignors to General Aniline Works, Inc., New York, N. Y., a corporation of Delaware No Drawing. Application June 24, 1936, Serial No. 87,043. In Germany July 19, 1935

10 Claims. (Cl. 260—96)

The present invention relates to azo dyestuffs and a process of producing same.

We have found that valuable azo dyestuffs are obtained by coupling aromatic diazo compounds with N-cyclohexyl-arylamines which are capable of being coupled and which may be substituted in one or both rings and which have an aliphatic radicle containing at least one oxygen atom attached to the connecting nitrogen atom and by so selecting the starting materials that the dyestuffs obained are free from sulphonic and carboxylic acid groups. The radicle attached to the connecting nitrogen atom may be for example a hydroxyethyl, hydroxypropyl or dihydroxypropyl radicle or a hydroxyethyl alkyl or hydroxyalkyl ether or hydroxyethyl ester radicle.

The new dyestuffs are eminently suitable for dyeing cellulose esters and ethers. They may also be used for dyeing hydrocarbons, such as benzene or paraffin wax, fats, such as palmitin or stearin, or artificial compositions. By reason of their good solubility in organic solvents, they are also suitable for the preparation of colored spirit or cellulose ester lacquers. The dyestuffs have a good fastness to sublimation and may therefore serve especially advantageously for the preparation of double-tone and intaglio printing inks.

The following examples will further illustrate how the present invention is carried out in practice but the invention is not restricted to these examples. The parts are by weight.

Example 1

The diazo compound derived from 139 parts of 1-amino-4-nitrobenzene is coupled with 232 parts of N - hydroxyethyl - N - cyclohexylaminobenzene which are dissolved in 5000 parts of water and 150 parts of concentrated hydrochloric acid. A dyestuff is obtained which dyes acetate artificial silk orange shades.

Example 2

The diazo compound derived from 173 parts of 1-amino-2-chlor-4-nitrobenzene is coupled with a solution of 232 parts of N-hydroxyethyl-N-cyclohexylaminobenzene in 5000 parts of water and 150 parts of concentrated hydrochloric acid. The dyestuff obtained colors nitrocellulose ester lacquers red shades. By reason of its good fastness to sublimation, it is also eminently suitable for use in double-tone and intaglio printing inks.

The dyestuff may be dissolved in benzene and treated with acetic acid anhydride. The acylated dyestuff thus obtained colors nitrocellulose ester lacquers red shades. The same dyestuff is obtained if N-aceto-hydroxyethyl-cyclohexylamino-benzene be used instead of N-hydroxyethyl-cyclohexyl-amino-benzene.

Example 3

The diazo compound derived from 214 parts of 1-amino-2,5-dichlor-4-nitrobenzene is poured onto ice and there is added thereto a solution of 232 parts of N-hydroxyethyl-N-cyclohexyl-aminobenzene in 5000 parts of water and 150 parts of concentrated hydrochloric acid. The dyestuff thus obtained colors nitrocellulose ester lacquers red shades and does not tend to sublime and blot in double-tone printing.

If the diazo compound derived from 1-amino-2,6-dichlor-4-nitrobenzene be employed, a dyestuff is obtained having similar properties but a slightly more yellow shade of color.

Example 4

The diazo solution derived from 188 parts of 1-amino-2,4-dinitrobenzene is coupled with a solution of 232 parts of N-hydroxyethyl-N-cyclohexylaminobenzene in 5000 parts of water and 150 parts of concentrated hydrochloric acid. The resulting dyestuff colors nitrocellulose ester lacquers Bordeaux red shades. It is also suitable for the preparation of double-tone and intaglio printing inks.

By using 1-amino-2,4,6-trichlorbenzene, a dyestuff is obtained which colors nitrocellulose ester lacquers yellow shades.

Similar dyestuffs which yield in nitrocellulose ester lacquers colors which lie throughout in the red region are obtained for example from the diazo compound of 1-amino-4-nitrobenzene with any of the following compounds: N-hydroxyethyl-cyclohexyl-1-amino-2-methylbenzene, N-hydroxyethyl-cyclohexyl-1-methyl - 3 - amino -4-methoxybenzene, the addition compounds derived from 2,3 or more molecular proportions of ethylene oxide and 1 molecular proportion of N-cyclohexylaminobenzene, or N-hydroxyethyl-cyclohexyl-1-aminonaphthalene.

Example 5

The diazo solution derived from 139 parts of 1-amino-4-nitrobenzene is coupled with a solution of 260 parts of N-ethoxyethyl-cyclohexyl-aminobenzene (corresponding to the formula

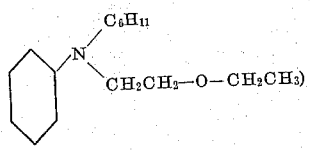

in 1500 parts of methanol. The dyestuff obtained dyes acetate artificial silk reddish orange shades. It is also suitable for coloring nitrocellulose ester lacquers.

What we claim is:

1. A process for the production of azo dyestuffs which consists in coupling aromatic diazo compounds with N-cyclohexylarylamines which arylamines are selected from the group consisting of the amines of the benzene and naphthalene series capable of being coupled which have an aliphatic radicle containing at least one oxygen atom attached to the connecting nitrogen atom by means of at least one —$CH_2$-group and by so selecting the starting materials that the dyestuffs obtained are free from sulphonic and carboxylic acid groups.

2. Azo dyestuffs free from sulphonic and carboxylic acid groups corresponding to the general formula

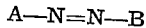

wherein A stands for an aryl radicle and B for the radicle of an N-cyclohexylarylamine which arylamine is selected from the group consisting of the amines of the benzene and naphthalene series capable of being coupled which has an aliphatic radicle containing at least one oxygen atom attached to the connecting nitrogen atom by means of at least one —$CH_2$-group.

3. Azo dyestuffs free from sulphonic and carboxylic acid groups corresponding to the general formula

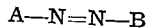

wherein A stands for a radicle of the benzene series and B for the radicle of an N-cyclohexylarylamine which arylamine is selected from the group consisting of the amines of the benzene and napthalene series capable of being coupled which has an aliphatic radicle containing at least one oxygen atom attached to the connecting nitrogen atom by means of at least one —$CH_2$-group.

4. Azo dyestuffs free from sulphonic and carboxylic acid groups corresponding to the general formula

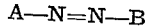

wherein A stands for a radicle of the benzene series and B for the radicle of an N-cyclohexylarylamine which arylamine is selected from the group consisting of the amines of the benzene and napthalene series capable of being coupled which has an aliphatic radicle of the general formula

wherein $n$ stands for a whole number, attached to the connecting nitrogen atom.

5. Azo dyestuffs free from sulphonic and carboxylic acid groups corresponding to the general formula

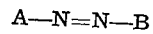

wherein A stands for a radicle of the benzene series and B for the radicle of an N-cyclohexylaminobenzene capable of being coupled which has an aliphatic radicle of the general formula

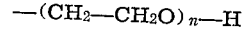

wherein $n$ stands for a whole number, attached to the connecting nitrogen atom.

6. Azo dyestuffs free from sulphonic and carboxylic acid groups corresponding to the general formula

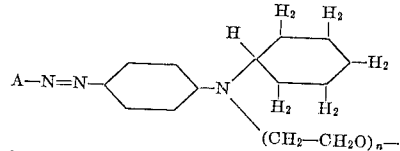

wherein A stands for a radicle of the benzene series and $n$ stands for a whole number.

7. Azo dyestuffs free from sulphonic and carboxylic acid groups corresponding to the general formula

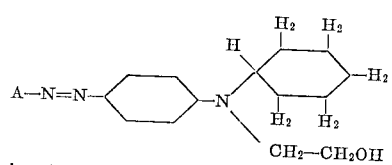

wherein A stands for a radicle of the benzene series.

8. The azo dyestuff of the formula

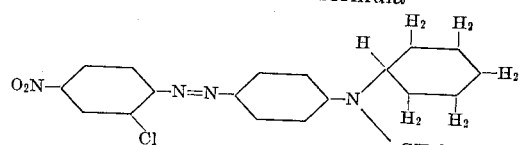

9. The azo dyestuff of the formula

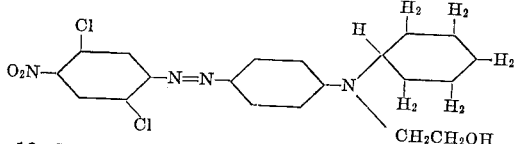

10. The azo dyestuff of the formula

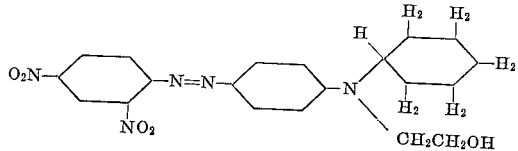

HANS KRZIKALLA.
PAUL GARBSCH.